«12» United States Patent
Park et al.

(10) Patent No.: US 8,548,376 B2
(45) Date of Patent: Oct. 1, 2013

(54) OPERATION METHOD AND APPARATUS OF RELAY AND BASE STATION

(75) Inventors: Kyu Jin Park, Anyang-si (KR); Jae Hoon Chung, Anyang-si (KR)

(73) Assignee: LG Electronics Inc., Seoul (KR)

(*) Notice: Subject to any disclaimer, the term of this patent is extended or adjusted under 35 U.S.C. 154(b) by 272 days.

(21) Appl. No.: 13/132,313

(22) PCT Filed: Nov. 5, 2009

(86) PCT No.: PCT/KR2009/006492
§ 371 (c)(1),
(2), (4) Date: Jun. 1, 2011

(87) PCT Pub. No.: WO2011/055870
PCT Pub. Date: May 12, 2011

(65) Prior Publication Data
US 2011/0319012 A1    Dec. 29, 2011

(51) Int. Cl.
*H04B 3/36* (2006.01)
*H04B 7/14* (2006.01)

(52) U.S. Cl.
USPC ............................................................. 455/7

(58) Field of Classification Search
USPC ............................................................. 455/7
See application file for complete search history.

(56) References Cited

U.S. PATENT DOCUMENTS

| 7,706,745 | B2 * | 4/2010 | Sanderford et al. | 455/11.1 |
| 2007/0155391 | A1 * | 7/2007 | Kang et al. | 455/450 |
| 2007/0160014 | A1 * | 7/2007 | Larsson | 370/338 |
| 2008/0009241 | A1 * | 1/2008 | Do et al. | 455/9 |
| 2008/0057973 | A1 | 3/2008 | Park | |
| 2008/0108369 | A1 * | 5/2008 | Visotsky et al. | 455/455 |
| 2009/0088164 | A1 * | 4/2009 | Shen et al. | 455/436 |

FOREIGN PATENT DOCUMENTS

KR    1020080052131    6/2008

* cited by examiner

*Primary Examiner* — Yuwen Pan
*Assistant Examiner* — Ankur Jain
(74) *Attorney, Agent, or Firm* — Lee, Hong, Degerman, Kang & Waimey

(57) ABSTRACT

A method of operating a relay station is provided. The method includes: receiving a beacon signal transmitted by a user equipment; measuring the beacon signal and transmitting a measurement result to a base station; and receiving routing information for the user equipment determined based on the measurement result, wherein the routing information indicates whether the user equipment communicates with the base station via the relay station or communicates with the base station directly. Accordingly, data can be transmitted through a proper path according to a channel state between the user equipment and the base station or the relay station in a wireless communication system employing the relay station, and thus cooperative transmission can be easily achieved between the base station and the relay station, which results in increase of efficiency of using radio resources.

12 Claims, 5 Drawing Sheets

OPERATION METHOD AND APPARATUS OF RELAY AND BASE STATION

CROSS-REFERENCE TO RELATED APPLICATIONS

This application is a 371 U.S. national stage application of International Application No. PCT/KR2009/006492, filed on Nov. 5, 2009, the contents of which are incorporated by reference herein in their entirety.

TECHNICAL FIELD

The present invention relates to wireless communications, and more particularly, to a method and apparatus for operating a base station or a relay station to perform communication by selecting a mobile station having a good channel state.

BACKGROUND ART

The conventional wireless communication system includes a mobile station (MS) and a base station (BS) providing a service in a specific region called a cell. Changes in a wireless environment may have an effect on quality of a signal transmitted in a radio channel between the MS and the BS. In particular, due to various factors in a surrounding environment, such as scatters, movement of the MS, etc., a wireless channel changes over time. In addition, there is a restriction in terms of a distance since reception power is rapidly decreased in proportion to a distance between wireless communication entities. Therefore, in general, the MS can communicate with the BS when the MS is located within the coverage of the BS. As such, due to several factors such as the scatters, a movement speed of the MS, a distance between transmission and reception, etc., a maximum transfer rate, a throughput of an intra-cell user, and a throughput of a whole cell are decreased between the BS and the MS. For example, when the MS is located in a cell boundary or when an obstacle such as a building exists between the MS and the BS, communication quality between the MS and the BS may not be satisfactory.

As an effort to overcome the aforementioned problem, the wireless communication system may employ a relay. The relay is a device for relaying a signal between the MS and the BS. By allowing the relay to employ various techniques capable of compensating for deterioration of a signal transmitted between the BS and the MS, it is expected to achieve an effect of coverage extension or the like.

The relay can be classified into L1, L2, and L3 relays according to a supported function or protocol layer. In brief, the L1 relay is a relay that retransmits a received signal by simply amplifying the signal, the L2 relay is a relay capable of performing a function for decoding the received signal and then encoding the signal, the L3 relay is a relay capable of transmitting a physical cell ID (PCI), a synchronization signal, a reference signal, and a control channel which are different from those of the BS.

If the relay is the L3 relay, the MS regards the relay as an independent BS, and backward compatibility with the legacy MS can be easily achieved. On the other hand, if the relay is the L2 relay, for an effective operation of the relay, the BS needs to perform management on whether to establish a connection between the relay and the MS to be connected to the relay.

SUMMARY OF THE INVENTION

Technical Problem

The present invention provides a technique for determining whether a mobile station communicates with a base station via a relay station or communicates with the base station directly in a wireless communication system employing the relay station.

In addition, the present invention intends to increase efficiency of using radio resources by allowing a proper communication path to be determined in consideration of a channel state, which varies on a real time bases, between a mobile station and a relay station or a base station.

Technical Solution

According to an aspect of the present invention, a method of operating a relay station is provided. The method includes: receiving a beacon signal transmitted by a mobile station; measuring the beacon signal and transmitting a measurement result to a base station; and receiving routing information for the mobile station determined based on the measurement result, wherein the routing information indicates whether the mobile station communicates with the base station via the relay station or communicates with the base station directly.

Advantageous Effects

According to the present invention, data can be transmitted through a proper path on the basis of a channel state between a mobile station and a base station or a relay station in a wireless communication system employing the relay station. Therefore, cooperative transmission can be easily achieved between the base station and the relay station, which results in increase of efficiency of using radio resources.

In addition, when a sounding reference signal (SRS) transmitted by the legacy mobile station in an uplink is used as a beacon signal for recognizing a channel state, backward compatibility with the legacy mobile station can be supported.

MODE FOR INVENTION

For clarity of explanation, the following description will focus on $3^{rd}$ generation partnership project (3GPP) long term evolution (LTE)/long term evolution-advanced (LTE-A). However, the technical features of the present invention are not limited thereto. Therefore, the present invention is also applicable to other wireless communication system such as institute of electrical and electronics engineers (IEEE) 802.16m.

Figure 1:
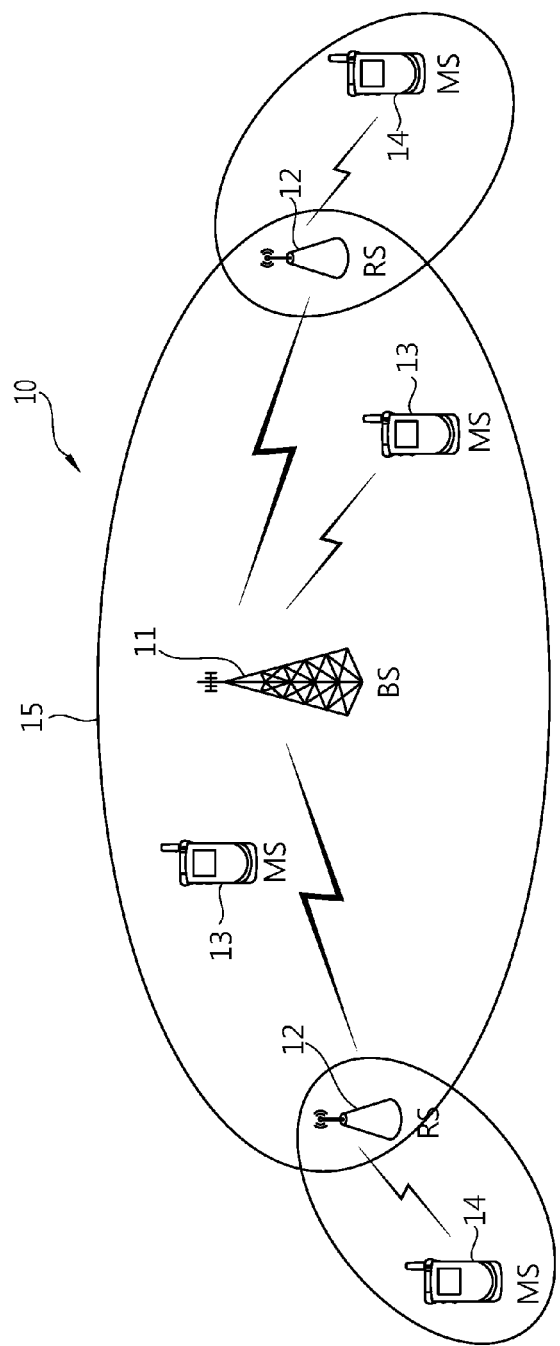
FIG. 1 is a diagram showing a wireless communication system employing a relay station.

FIG. 1 is a diagram showing a wireless communication system employing a relay station (RS).

Referring to FIG. 1, a wireless communication system 10 employing an RS includes at least one base station (BS) 11. Each BS 11 provides a communication service to a specific geographical region 15 generally referred to as a cell. The cell can be divided into a plurality of regions, and each region can be referred to as a sector. One or more cells may exist in the coverage of one BS. The BS 11 is generally a fixed station that communicates with a user equipment (UE) 13 and may be referred to as another terminology, such as an evolved node-B (eNB), a base transceiver system (BTS), an access point, an access network (AN), etc. The BS 11 can perform functions such as connectivity between an RS 12 and a UE 14, management, control, resource allocation, etc.

The RS 12 is a device for relaying a signal between the BS 11 and the UE 14, and is also referred to as another terminology such as a relay node (RN), a repeater, a relay, etc.

The RS can be classified into several types as shown in Table 1 below.

TABLE 1

| function | L1 Relay | L2 Relay | L3 Relay |
| --- | --- | --- | --- |
| RF function | X | X | X |
| Coder/Decoder and CRC | — | X | X |
| HARQ | — | X | X |
| Multiplex & Demultiplex of MAC SDU | — | X | X |
| Priority(Qos) handling | — | X | X |
| Scheduling | — | X | X |
| Outer ARQ | — | (X) | X |
| (Re)-Segmentation and concatenation | — | (X) | X |
| Header compression(ROHC) | — | — | — |
| Reordering of lower layer SDUs | — | — | — |
| In-sequence delivery of upper layer PDUs | — | — | — |
| Duplicate detection of lower layer SDUs | — | — | — |
| Ciphering | — | — | — |
| System information broadcast | — | — | X |
| RRC Connection set-up and maintenance | — | — | X |
| Radio Bearers set-up and maintenance | — | — | — |
| Mobility function | — | — | X |
| MBMS services control | — | — | — |
| Paging | — | — | — |
| QoS management | — | — | (X) |
| UE measurement reporting and control the reporting | — | — | (X) |
| NAS signalling handling | — | — | — |

In Table 1, 'X' denotes that a corresponding function is supported, '(X)' denotes that the corresponding function can be supported, and '−' denotes that the corresponding function is not supported. In Table 1, a relay station is classified into an L1 relay, an L2 relay, and an L3 relay. The greatest feature of these relays is that the L1 relay is a relay which cannot perform an independent scheduling function and the L3 relay is a relay which has a similar pattern as one cell, has an independent physical cell ID, and can transmit its own synchronization signal and reference signal.

The L2 relay is a relay having a function for decoding a received signal, re-encoding the signal, and transmitting the signal to the BS or the UE and having a scheduling function. That is, the L2 relay restores information by performing demodulation, decoding, and the like on a signal received from the BS or the UE, and then generates a signal by performing coding, modulation, and the like and delivers the signal to the UE or the BS. The L2 relay does not have a physical cell ID different from that of the BS, and may transmit a synchronization channel (SCH) which is the same as that of the BS or may not transmit the SCH. Hereinafter, it is assumed that the relay is the L2 relay.

Each of the UEs 13 and 14 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc.

Hereinafter, the macro UE (or simply Ma UE) 13 is a UE which directly communicates with the BS 11, and the relay UE (or simply Re UE) 14 is a UE which communicates with the BS via the RS.

A downlink (DL) denotes communication from the BS 11 to the Ma UE 13, and an uplink (UL) denotes communication from the Ma UE 13 to the BS 11. A backhaul link denotes a link between the BS 11 and the RS 12. A backhaul downlink denotes communication from the BS 11 to the RS 12, and a backhaul uplink denotes communication from the RS 12 to the BS 11. An access link denotes a link between the RS 12 and the Re UE 14. An access downlink denotes communication from the RS 12 to the Re UE 14, and an access uplink denotes communication from the Re UE 14 to the RS 12.

Figure 2:
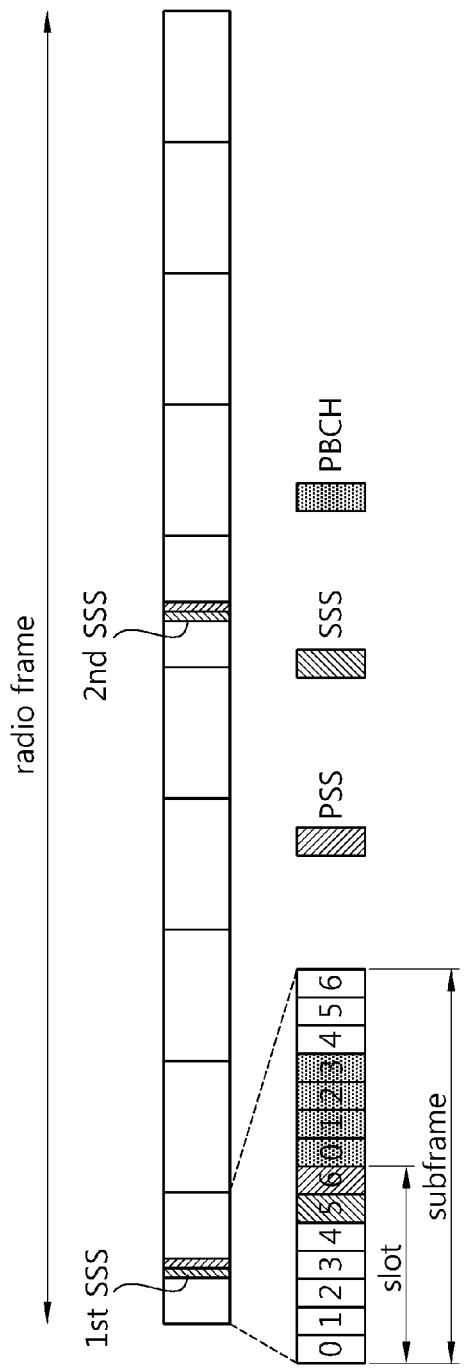
FIG. 2 shows a structure of a radio frame in $3^{rd}$ generation partnership project (3GPP) long term evolution (LTE).

FIG. 2 shows a structure of a radio frame in 3GPP LTE. Section 6 of the 3GPP TS 36.211 V8.4.0 (2008-09) may be incorporated herein by reference. The radio frame consists of 10 subframes, and one subframe consists of two slots. A time for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in DL transmission, the OFDM symbol is for representing one symbol period, and can be referred to as other terms. For example, if single carrier FDMA (SC-FDMA) is used as a UL multiple access scheme, the OFDM symbol can also be referred to as an SC-FDMA symbol. Although it is described herein that one slot includes 7 OFDM symbols, this is for exemplary purposes only, and thus the number of OFDM symbols included in one slot may change depending on a cyclic prefix (CP) length. According to 3GPP TS 36.211, in case of a normal CP, one subframe includes 7 OFDM symbols, and in case of an extended CP, one subframe includes 6 OFDM symbols. The radio frame structure is for exemplary purposes only, and thus the number of subframes included in the radio frame and the number of slots included in the subframe may change variously.

A synchronization signal may include a primary synchronization signal (PSS) and a secondary synchronization signal (SSS). The PSS is transmitted in last OFDM symbols of a $1^{st}$ slot and an $11^{th}$ slot. The PSS is used to attain OFDM symbol synchronization or slot synchronization, and is in association with a physical cell identify (ID). A primary synchronization code (PSC) is a sequence used for the PSS. There are three PSCs in the 3GPP LTE. One of the three PSCs is transmitted using the PSS according to the cell ID. The same PSC is used for each of the last OFDM symbols of the $1^{st}$ slot and the $11^{th}$ slot.

The SSS includes a $1^{st}$ SSS and a $2^{nd}$ SSS. The $1^{st}$ SSS and the $2^{nd}$ SSS are transmitted in an OFDM symbol adjacent to an OFDM symbol in which the PSS is transmitted. The SSS is used to attain frame synchronization. The SSS is used to attain the cell ID together with the PSS. The $1^{st}$ SSS and the $2^{nd}$ SSS use different secondary synchronization codes (SSCs). If the 1st SSS and the 2nd SSS each include 31 subcarriers, sequences of two SSCs with a length of 31 are respectively used for the 1st SSS and the 2nd SSS.

A physical broadcast channel (PBCH) is transmitted in first four OFDM symbols in a 2nd slot of a 1st subframe in a radio frame. The PBCH carries system information necessary for communication between a UE and a BS. System information transmitted through the PBCH is referred to as a master information block (MIB). System information transmitted through a physical downlink control channel (PDCCH) is referred to as a system information block (SIB).

In a wireless communication system including an RS, if a UE is located within the coverage of a BS, the UE can be directly connected to the BS. However, if a distance between the UE and the BS is far or signal shielding is severe due to buildings or the like, communication with the BS may be achieved via the RS within a cell so that communication is performed in a better channel state. In addition, when the UE is located outside the coverage of the BS and thus a channel state with the BS is not good, the UE can be connected to the BS via the RS. That is, the UE may perform communication by being directly connected to the BS or may perform communication via the RS. However, if the RS is the L2 relay for example, there may be case where the UE has to communicate with the BS via the RS even if a channel state is good in an uplink between the UE and the BS whereas a channel state of an access uplink between the UE and the RS is not good since the RS cannot independently perform management on whether the RS is connected to the UE. That is, it may result in waste of radio resources and decrease of a throughput.

Figure 3:
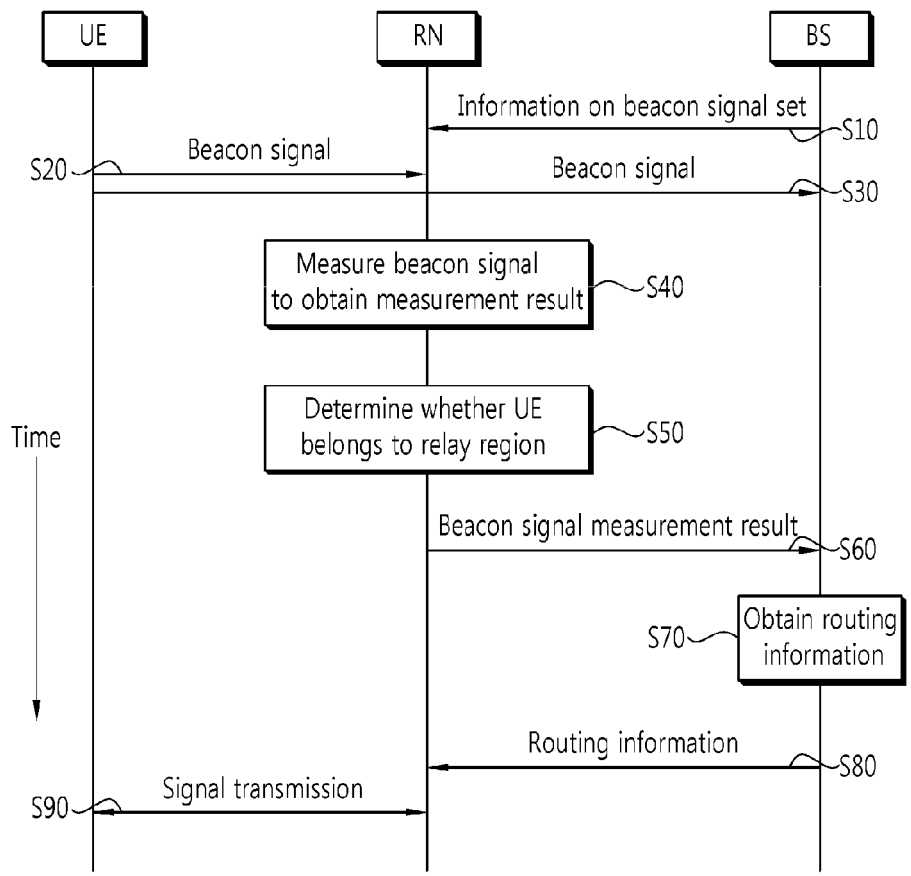
FIG. 3 shows a method of operating a relay station and a base station according to an embodiment of the present invention.

FIG. 3 shows a method of operating a relay node (RN) and a BS according to an embodiment of the present invention.

The BS transmits information on a predetermined beacon signal set of each UE, which communicates with the BS, to the RN (step S10). That is, the BS provides the RN with information on beacon signals for the UEs which are directly communicating with the BS and for the UEs which are communicating with the BS via the RN. The BS may report all information for the beacon signal set only when the RN is initially set up, and thereafter may report only update information on the beacon signal set in a case where the UE newly enters a cell due to handover, initial entry, etc., or in a case where a link to the BS is disconnected due to an idle mode, a connection release mode, etc.

Herein, a beacon signal is a signal that is used for measurement for determining whether each UE will communicate with the BS via the RN or communicate with the BS directly. The beacon signal is a signal which is allocated by being configured with codes having an orthogonal property for each UE, and may be a signal pre-defined between the BS and the UE. The beacon signal allocated to each UE may be generated by applying a different cyclic shift value to a common base sequence. The beacon signal may be defined uniquely so that the beacon signal corresponds to each UE in a one-to-one manner. For the beacon signal, a dedicated radio resource may be allocated to each UE.

The beacon signal set includes information on beacon signals of respective UEs which communicate with the BS. The information on the beacon signal may include a temporal position in a subframe of the beacon signal, a frequency band in use, a period, a code in use, etc. The information on the beacon signal may be given by using a higher layer signal such as a radio resource control (RRC) signal.

In addition, the beacon signal set may include an ID of a UE corresponding to the beacon signal, and a status indicator indicating whether the UE is a UE which belongs to a relay region. Herein, the relay region is a region in which the RN can effectively support a relay operation between the BS and the UE. The relay region may be a region in which communication from the UE to the BS via the RN is more effective than direct communication from the UE to the BS. When a beacon signal transmitted by the UE included in the relay region is received both by the BS and the RN, values (e.g., a power attenuation value, an error rate, etc.) of the beacon signal measured in the RN may be smaller than values measured in the BS. Alternatively, reception strength of the measured beacon signal may appear to be greater in the RN.

The RN receives the beacon signal from the UE (step S20). Then, the RN measures the received beacon signal to obtain a measurement result (step S40). As described above, the measurement of the beacon signal can be performed according to various criteria such as a power attenuation value, an error rate, reception strength, or the like of the received beacon signal. It is assumed hereinafter that a channel state is better when a greater value is obtained as the measurement result of the beacon signal.

The RN determines whether the UE which transmits the beacon signal is an UE which belongs to the relay region (step S50). That is, it is determined whether the UE which transmits the beacon signal is a UE which has been communicating with the BS via the RN. The RN can perform such a determination process by using a pre-stored status indicator and UE ID corresponding to the beacon signal.

The RN transmits the measurement result of the beacon signal (step S60). In this case, the RN can transmit to the BS a measurement result for all UEs which transmit the beacon signal.

Alternatively, the RN can transmit to the BS a beacon signal measurement result only for some UEs. For example, if the UE which transmits the beacon signal is a UE which has been communicating with the BS via the RN, i.e., the UE existing within the relay region, then the measurement result of the received beacon signal can be transmitted to the BS only when it is less than a predetermined threshold T_L. If the measurement result of the received beacon signal is less than the predetermined threshold, it can be determined that the UE connected to the RN moves out of the relay region. Therefore, by reporting the beacon signal measurement result for the UE to the BS, the BS can perform management such that the UE is no longer connected to the RN.

If the UE which transmits the beacon signal is not a UE which exists in the relay region such as a UE which has been directly communicating with the BS, the measurement result can be transmitted to the BS only when the measurement result of the received beacon signal is greater than a predetermined threshold T_H. If the measurement result of the received beacon signal is greater than the predetermined threshold, it may be determined that a UE not belonging to the relay region newly enters the relay region. Therefore, by reporting the beacon signal measurement result for the UE to the BS, the BS can perform management such that the UE communicates with the BS via the RN. The aforementioned thresholds T_L and T_H may have the same value.

The BS obtains routing information by using the measurement value of the beacon signal which received directly from the UE (step S30) and/or the measurement result of the beacon signal received from the RN (step S70). Herein, the routing information is information indicating whether the UE communicates with the BS via the RN or communicates with the BS directly. For example, if the measurement value of the beacon signal directly received by the BS from the UE is greater than the measurement result of the beacon signal received from the RN, management can be performed such that the UE can directly communicate with the BS.

Alternatively, a measurement result of a beacon signal transmitted by the RN for a specific UE may be used so that the specific UE can communicate with the BS via the RN. This method can be applied when the BS fails to receive the beacon signal from the specific UE and thus there is no measurement value to be compared.

The BS transmits the routing information to the RN (step S80). The RN transmits or receives a signal to the UE if the routing information is a value indicating that the UE communicates with the BS via the RN (step S90).

Although a case where a beacon signal is newly defined and used is explained in the aforementioned embodiment, the present invention is not limited thereto, and thus an existing reference signal can be used as the beacon signal. For example, an existing sounding reference signal (SRS) can be used as the beacon signal.

Figure 4:
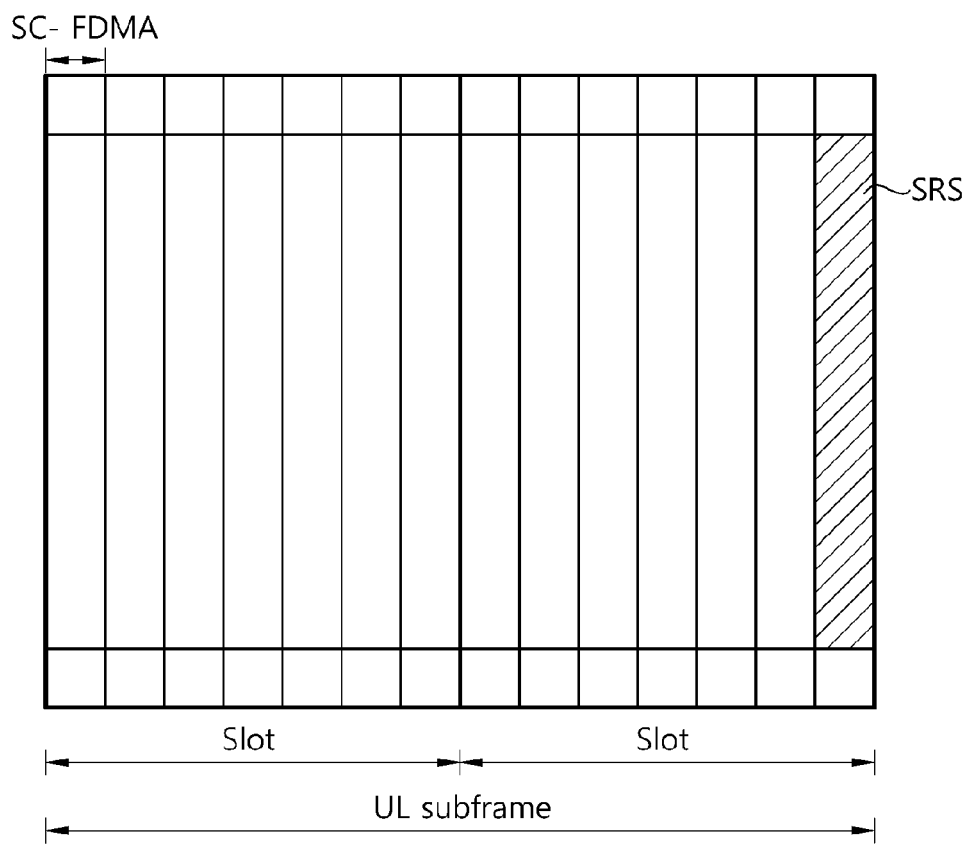
FIG. 4 shows a sounding reference signal (SRS) transmitted in an uplink subframe.

FIG. 4 shows an SRS transmitted in a UL subframe.

The SRS is one type of a UL reference signal (RS). The UL RS includes a demodulation (DM)-RS and the SRS. The DM-RS is an RS in association with transmission of a physical uplink shared channel (PUSCH) which is a physical channel for delivering UL data or a physical uplink control channel (PUCCH) which is a physical channel for delivering UL control channel. The SRS is an RS not association with the PUSCH or the PUCCH. The DM-RS or the SRS uses the same base sequence set.

The SRS can be used to provide status information for a UL channel with respect to a wider frequency band than the PUSCH currently transmitted by a UE. Alternatively, the SRS can be used even if the UE does not perform PUSCH transmission. The SRS can be used for other purposes. For example, the SRS can be used so that the UE can easily estimate UL timing for UL transmission using a narrow frequency band or for not-frequent UL transmission. The SRS can be transmitted through a last SC-FDMA symbol of a UL subframe in a time domain, and is not limited to a band for PUSCH transmission in a frequency domain. Information on the SRS may be transmitted through a higher layer signal such as an RRC signal, or may be transmitted by using a part of system information or a physical downlink control channel (PDCCH).

When the SRS is used as the beacon signal, it is not necessary to define a new beacon signal, and thus there is an advantage in that backward compatibility with respect to a UE which operates in the conventional LTE rel-8 can be supported. The section 5.5.3 of 3GPP TS 36.211. V8.4.0 (2008-09) can be incorporated herein by reference for the SRS signal.

Alternatively, a frequency band, a cyclic shift (CS), a period value, etc., can be modified while using the SRS as the beacon signal. For example, in a case where the SRS is used as the beacon signal for determining a path for communication with an RN or a BS as described in the embodiment of the present invention, an allocation period of the SRS can be determined to be greater than that of the existing SRS, and a frequency band to which the SRS is allocated can be limited to a specific region. In addition, the BS can transmit to a UE an additional bit for reporting that the SRS is used for this purpose.

A method for an operation capable of transmitting data through a proper path according to a channel situation between a UE and a BS or an RN by using a beacon signal in an uplink has been described above.

Hereinafter, a method for allowing a UE to identify a BS or an RN in a downlink will be described. The BS or the RN can report to the UE whether it is the BS or the RN through a broadcast channel (BCH). Alternatively, the BS or the RN can report to the UE whether it is the BS or the RN through a downlink control channel, for example, a physical control format indicator channel (PCFICH) which reports how many OFDM symbols are used to constitute a control region of a DL subframe. For this, the BS or the RN can additionally define an indicator in the PCFICH to report whether it is the BS or the RN. By using the indicator value, the UE can know whether a source station which is currently transmitting a signal is the BS or the RN.

When the UE enters a cell, the UE reports a previously received indicator value to the BS or the RN, and when the indicator value changes, reports it again to the BS or the RN. Upon receiving the indicator value from the UE, the RN relays the value to the BS.

Figure 5:
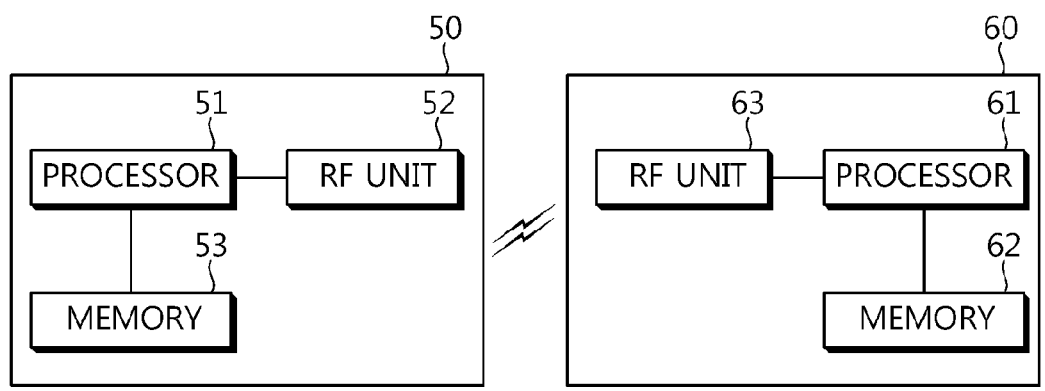
FIG. 5 is a block diagram showing a wireless communication system for implementing an embodiment of the present invention.

FIG. 5 is a block diagram showing a wireless communication system for implementing an embodiment of the present invention. A BS 50 includes a processor 51, a memory 52, and a radio frequency (RF) unit 53. The processor 51 receives from an RN a measurement result obtained by measuring a beacon signal transmitted by a UE, and generates routing information on the UE determined based on the measurement result. The memory 52 is coupled to the processor 51, and stores a variety of information for driving the processor 51. The memory 52 can store information on the beacon signal predetermined for each UE which communicates with the BS. The RF unit 53 is coupled to the processor 51, and transmits and/or receives a radio signal.

An RN 60 includes a processor 61, a memory 62, and an RF unit 63. The processor 61 measures a beacon signal received from the UE and transmits a measurement result to the BS. Further, the processor 61 receives routing information for the UE determined based on the measurement result, and performs a function for transmitting or receiving a signal to the UE on the basis of the routing information. The memory 62 is coupled to the processor 61, and stores a variety of information for driving the processor 61. For example, the memory 62 stores information, which is received from the BS, on the beacon signal predetermined for each UE which communicates with the BS. The RF unit 63 is coupled to the processor 61, and transmits and/or receives a radio signal.

The processors 51 and 61 may include an application-specific integrated circuit (ASIC), a separate chipset, a logic circuit, and/or a data processing unit. The memories 52 and 62 may include a read-only memory (ROM), a random access memory (RAM), a flash memory, a memory card, a storage medium, and/or other equivalent storage devices. The RF units 53 and 63 may include a base-band circuit for processing a radio signal. When the embodiment of the present invention is implemented in software, the aforementioned methods can be implemented with a module (i.e., process, function, etc.) for performing the aforementioned functions. The module may be stored in the memories 52 and 62 and may be performed by the processors 51 and 61. The memories 52 and 62 may be located inside or outside the processors 51 and 61, and may be coupled to the processors 51 and 61 by using various well-known means.

Although a series of steps or blocks of a flowchart are described in a particular order when performing methods in the aforementioned exemplary system, the steps of the present invention are not limited thereto. Thus, some of these steps may be performed in a different order or may be concurrently performed. Those skilled in the art will understand that these steps of the flowchart are not exclusive, and that another step can be included therein or one or more steps can be omitted without having an effect on the scope of the present invention.

Various modifications may be made in the aforementioned embodiments. Although all possible combinations of the various modifications of the embodiments cannot be described, those ordinary skilled in that art will understand possibility of other combinations. Therefore, the present invention is not intended to be limited to the embodiments shown herein but is to be accorded the widest scope consistent with the principles and novel features disclosed herein.

What is claimed is:

1. A method of operating a relay station, the method comprising:

receiving information related to a beacon signal set from a base station (BS);

receiving a beacon signal transmitted by a user equipment (UE), wherein a beacon signal is allocated for each UE that communicates with the BS by applying a different cyclic shift value to a common base sequence and the beacon signal set includes an identifier of the UE and a status indicator indicating whether the UE belongs to a relay region;

measuring the received beacon signal to obtain a measurement result;

determining whether the UE belongs to the relay region based on the status indicator and the identifier of the UE;

selectively transmitting the measurement result to the base station based on the measurement result; and receiving routing information for the UE that is determined based on the measurement result, wherein the routing information indicates whether the UE communicates with the BS via the relay station or communicates with the BS directly, wherein the measurement result is transmitted to the base station only when the measurement result is less than a predetermined threshold if the UE communicates with the BS via the relay station, and wherein the measurement result is transmitted to the BS only when the measurement is greater than the predetermined threshold if the UE does not communicate with the BS via the relay station.

2. The method of claim 1, further comprising communicating a signal between the relay station and the UE if the routing information indicates communication with the BS via the relay station.

3. The method of claim 1, wherein the beacon signal is a sounding reference signal (SRS).

4. The method of claim 1, wherein the beacon signal comprises orthogonal codes for each UE.

5. The method of claim 1, further comprising receiving information from the BS that is related to a predetermined beacon signal of the UE that communicates with the BS.

6. The method of claim 1, wherein the relay station is an L2 relay station.

7. A relay station comprising:

a radio frequency (RF) unit configured to transmit and receive a radio signal; and a processor coupled to the RF unit and configured to:

receive information related to a beacon signal set from a base station (BS);

receive a beacon signal transmitted by a user equipment (UE), wherein a beacon signal is allocated for each UE that communicates with the BS by applying a different cyclic shift value to a common base sequence and the beacon signal set includes an identifier of the UE and a status indicator indicating whether the UE belongs to a relay region;

measure the received beacon signal to obtain a measurement result;

determine whether the UE belongs to the relay region based on the status indicator and the identifier of the UE;

selectively transmit the measurement result to the BS based on the measurement result; and receive routing information for the UE that is determined based on the measurement result, wherein the routing information indicates whether the UE communicates with the BS via the relay station or communicates with the BS directly, wherein the measurement result is transmitted to the BS only when the measurement result is less than a predetermined threshold if the UE communicates with the BS via the relay station, and wherein the measurement result is transmitted to the BS only when the measurement result is greater than the predetermined threshold if the UE does not communicate with the BS via the relay station.

8. The method of claim 7, wherein the processor is further configured to communicate a signal between the relay station and the UE if the routing information indicates communication with the BS via the relay station.

9. The method of claim 7, wherein the beacon signal is a sounding reference signal (SRS).

10. The method of claim 7, wherein the beacon signal comprises orthogonal codes for each user equipment.

11. The method of claim 7, wherein the processor is further configured to receive information from the BS that is related to a predetermined beacon signal of the UE that communicates with the BS.

12. The method of claim 7, wherein the relay station is an L2 relay station.

* * * * *